(12) United States Patent
Uematsu et al.

(10) Patent No.: US 9,419,269 B2
(45) Date of Patent: Aug. 16, 2016

(54) PRESS APPARATUS FOR ELECTRODE, ELECTRODE MANUFACTURING APPARATUS, AND ELECTRODE MANUFACTURING METHOD

(75) Inventors: Ikuo Uematsu, Yokohama (JP); Masaomi Nakahata, Kamakura (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 954 days.

(21) Appl. No.: 13/617,239

(22) Filed: Sep. 14, 2012

(65) Prior Publication Data
US 2013/0074711 A1 Mar. 28, 2013

(30) Foreign Application Priority Data
Sep. 26, 2011 (JP) ................................. 2011-209722

(51) Int. Cl.
*B30B 3/00* (2006.01)
*H01M 4/04* (2006.01)
(Continued)

(52) U.S. Cl.
CPC ............. *H01M 4/0471* (2013.01); *B30B 3/005* (2013.01); *B30B 3/04* (2013.01); *B30B 11/165* (2013.01); *H01M 4/0435* (2013.01); *Y02E 60/122* (2013.01); *Y02P 70/54* (2015.11)

(58) Field of Classification Search
CPC ............. H01M 4/0435; H01M 4/0471; H01M 10/0525; H01M 10/0587; H01M 2004/021; H01M 2004/027; H01M 2/26; H01M 4/139; H01M 4/661; H01M 4/04; H01M 4/0433; H01M 4/0404; H01M 10/04; H01M 10/0431; B30B 3/005; B30B 3/04; B30B 11/165; B30B 11/208; B30B 11/003; B65H 18/10; B65H 23/14; B65H 23/198; B65H 23/34; B65H 26/04; Y02E 60/122; Y02P 70/54

USPC .......... 100/155 R, 161, 163 A, 176; 429/231; 29/623.1
See application file for complete search history.

(56) References Cited

U.S. PATENT DOCUMENTS 3,783,666 A * 1/1974 Rosansky .................. B21B 3/00
100/118

FOREIGN PATENT DOCUMENTS

CN 101877397 A 11/2010
JP 2001-76711 3/2001
(Continued)

OTHER PUBLICATIONS

Office Action issued Sep. 24, 2013, in Japanese Patent Application No. 2011-209722 with English translation.
(Continued)

*Primary Examiner* — Jimmy T Nguyen
(74) *Attorney, Agent, or Firm* — Oblon, McClelland, Maier & Neustadt, L.L.P

(57) ABSTRACT

According to one embodiment, a press apparatus for an electrode, includes, a press unit configured to compress an electrode sheet includes a first region formed with an electrode layer on a surface thereof and a second region on which the electrode layer is not formed, and a stretching unit includes a stretching member, which comprises a projecting surface located opposite the electrode sheet and projecting toward the electrode sheet, in a position corresponding to the second region, a retracted surface retracted from the electrode sheet relative to the projecting surface, in a position corresponding to the first region, and a relief surface retracted away from the electrode sheet, in a position corresponding to an edge portion of the electrode sheet.

3 Claims, 4 Drawing Sheets

(51) Int. Cl.
*B30B 11/16* (2006.01)
*B30B 3/04* (2006.01)

(56) References Cited

FOREIGN PATENT DOCUMENTS

| JP | 2001-297753 | | 10/2001 |
| JP | 2003-100286 | A | 4/2003 |
| JP | 2009104850 | A * | 5/2009 |

OTHER PUBLICATIONS

U.S. Appl. No. 13/974,436, filed Aug. 23, 2013, Morishima, et al.
U.S. Appl. No. 13/969,047, filed Aug. 16, 2013, Kobayashi, et al.
U.S. Appl. No. 13/974,601, filed Aug. 23, 2013, Morishima, et al.
Chinese Office Action issued Jul. 23, 2014, in China Patent Application No. 201210389770.0 (with English translation).

* cited by examiner

B-B

PRESS APPARATUS FOR ELECTRODE, ELECTRODE MANUFACTURING APPARATUS, AND ELECTRODE MANUFACTURING METHOD

CROSS-REFERENCE TO RELATED APPLICATIONS

This application is based upon and claims the benefit of priority from Japanese Patent Application No. 2011-209722, filed Sep. 26, 2011, the entire contents of which are incorporated herein by reference.

FIELD

Embodiments described herein relate generally to a press apparatus for an electrode, electrode manufacturing apparatus, and electrode manufacturing method.

BACKGROUND

In recent years, there has been a demand for high-capacity, long-life, quick-charging batteries that are used as a power supply for hybrid electric vehicles, as well as for conventional small electronic devices. An electrode is densely compressed to facilitate as many active materials as possible to be filled into a battery that is spatially limited.

In manufacturing an electrode, an electrode material containing active materials is applied to a base formed of a band-like electrical power collector, such as a metal foil, and dried to form an electrode film.

DETAILED DESCRIPTION

In general, according to one embodiment, a press apparatus for an electrode comprises a press unit and a stretching unit. The press unit is configured to compress an electrode sheet. The electrode sheet comprises a first region formed with an electrode layer on a surface thereof and a second region on which the electrode layer is not formed. The stretching unit comprises a stretching member, which comprises a projecting surface, a retracted surface, and a relief surface. The projecting surface is located opposite the electrode sheet and projecting toward the electrode sheet, in a position corresponding to the second region. The retracted surface retracted from the electrode sheet relative to the projecting surface, in a position corresponding to the first region. The relief surface retracted away from the electrode sheet, in a position corresponding to an edge portion of the electrode sheet. The stretching unit is configured to apply tension to the second region.

First Embodiment

A manufacturing apparatus and method for an electrode according to a first embodiment will now be described with reference to FIGS. 1 to 4. In these drawings, arrows X, Y and Z indicate three orthogonal directions. Further, some structural elements are enlarged or reduced in scale or omitted for ease of illustration. The electrode manufacturing apparatus according to the embodiment comprises a press apparatus 13 for an electrode shown in FIG. 1.

Figure 1:
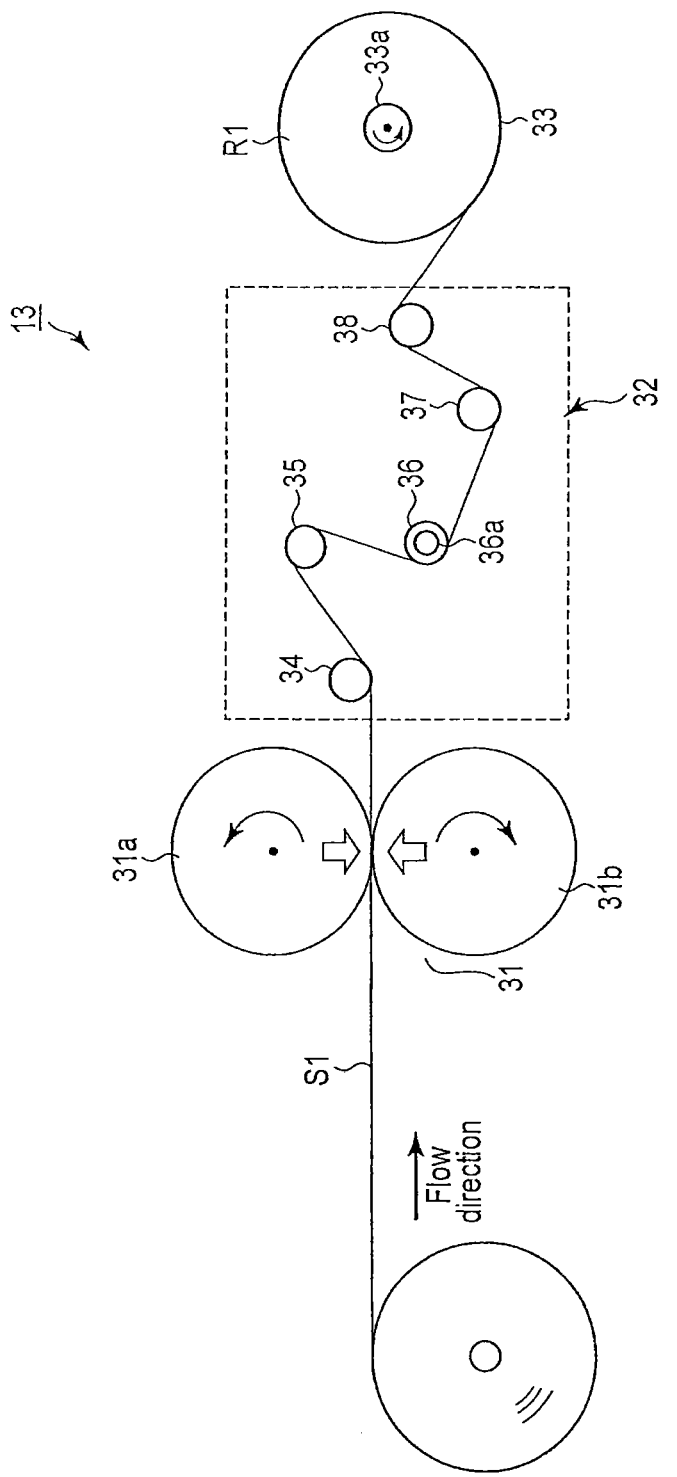
FIG. 1 is an explanatory diagram showing a press apparatus according to a first embodiment.

The press apparatus 13 shown in FIG. 1 comprises a press unit 31, stretching unit 32, and take-up unit 33, which are successively arranged downstream from the upstream side in the feed direction of an electrode sheet S1. The press unit 31 serves to compress the electrode sheet S1 to improve the electrode density. The stretching unit 32 serves to correct distortion of the electrode sheet S1 that occurs during the compression. The take-up unit 33 is used to take up the pressed and corrected electrode sheet S1.

The press unit 31 comprises a pair of press rollers 31a and 31b. As the press rollers 31a and 31b are rotated about an axis that extends along the Y-axis by a drive unit, the electrode sheet S1 sandwiched between them is compression-molded.

As a rotary shaft 33a is rotated about the axis extending along the Y-axis by the drive unit, the take-up unit 33 takes up the electrode sheet S1 like a hoop, thereby forming a roll R1.

The stretching unit 32 comprises a plurality of metallic guide rollers (driven rollers) 34 to 38 and serves to guide the electrode sheet S1 from the press unit 31 to the take-up unit 33. Longitudinal tension (take-up tension) acts on the electrode sheet S1 that is transported from the press rollers 31a and 31b to the take-up unit 33. The guide rollers 34 to 38 are alternately arranged on the upper and lower surfaces of the electrode sheet S1 so that the tension on the sheet S1 is within a desired range suitable for take-up operation. The guide roller 36 functions as a stretching member.

Figure 2:
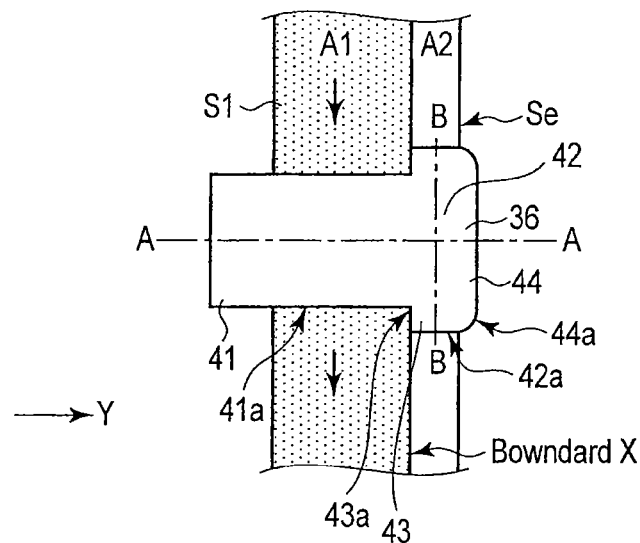
FIG. 2 is a diagram showing the positional relationship between a guide roller of the press apparatus and an electrode sheet S1.
Figure 3:
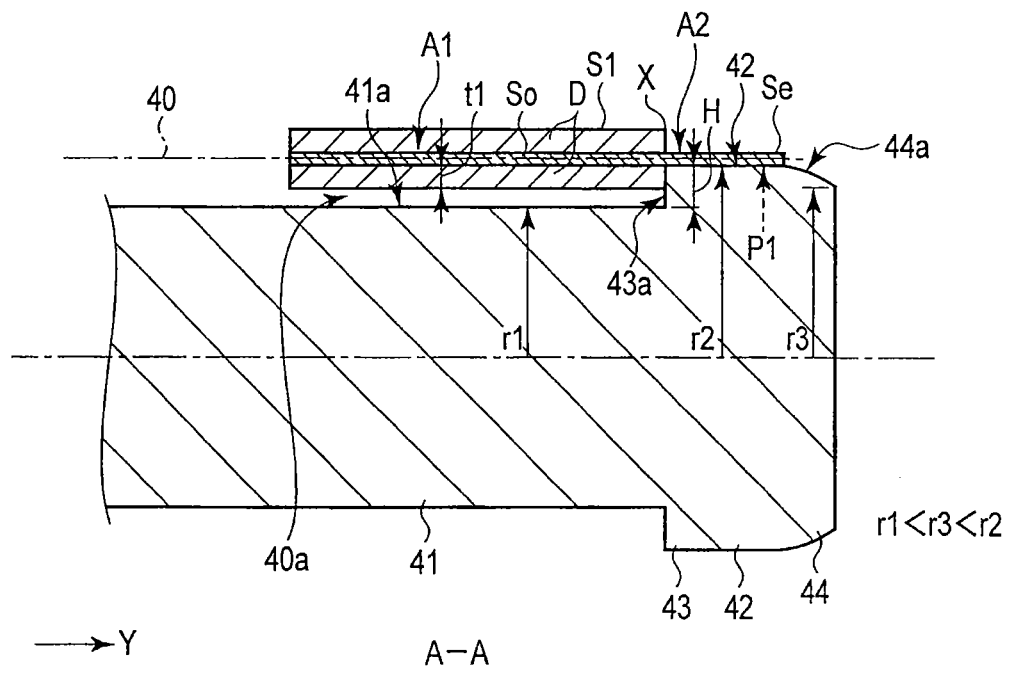
FIG. 3 is a sectional view taken along line A-A of FIG. 2.
Figure 4:
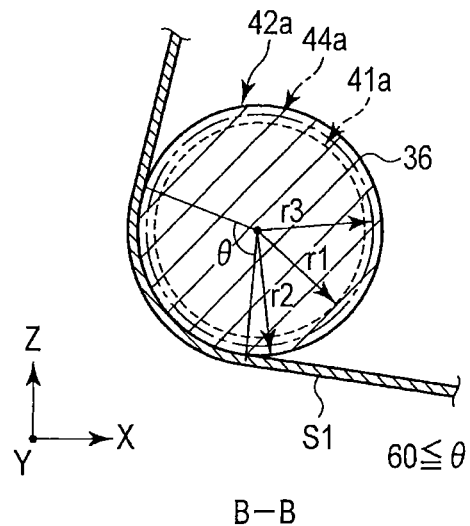
FIG. 4 is a sectional view taken along line B-B of FIG. 2.

As shown in FIGS. 2 to 4, the guide roller 36 comprises a small-diameter portion 41 on one axial side of a step portion 43 and a large-diameter portion 42 on the other side. A relief portion 44 is disposed at a predetermined distance from a boundary between the small- and large-diameter portions 41 and 42 on the other side. The portions 41 and 42 are columnar structures connected to each other by the step portion 43. The relief portion 44 is formed continuous with the large-diameter portion 42 and rounded so that its diameter gradually decreases and its profile is curved.

The outer peripheral surfaces of the small-diameter portion 41, large-diameter portion 42, and relief portion 44 constitute a retracted surface 41a, projecting surface 42a, and relief surface 44a, respectively. Specifically, the outer peripheral surface of the guide roller 36 is continuously formed with the retracted surface 41a, projecting surface 42a, and relief surface 44a, which face a coated region A1 of the electrode sheet S1, non-coated region A2, and edge portion Se of the sheet S1, respectively. The respective radii r1, r2 and r3 of the small-diameter portion 41, large-diameter portion 42, and relief portion 44 satisfy the relationship $r1 < r3 < r2$.

The projecting surface 42a projects relative to a conveying plane 40 indicated by a broken line in FIG. 3, and the retracted surface 41a is separated from the conveying plane 40. The relief surface 44a is curved in such an arc that it gradually separates from the conveying plane 40.

The guide roller 36 and electrode sheet S1 are relatively positioned so that the coated region A1 faces the small-diameter portion 41 and does not run on the large-diameter portion 42. Specifically, a boundary X between the coated and non-coated regions A1 and A2 is located in the vicinity of the step portion 43 and nearer to the small-diameter portion 41 than the step portion 43.

When the electrode sheet S1 is wound around the guide roller 36, the retracted surface 41a or the outer peripheral surface of the small-diameter portion 41 is not in contact with either a base S0 or electrode layers D of the electrode sheet S1 such that a gap 40a is defined between them. Thus, a difference in level H that is determined by the difference (r2−r1) between the respective radii r2 and r1 of the large- and small-diameter portions 42 and 41 is larger than a thickness t1 of each electrode layer D (H>t1).

If the thickness t1 of each electrode layer D is 100%, the difference in level H (%) should preferably satisfy the following equation (1):

$$150 \leq H \leq 600. \quad (1)$$

Stress can be fully concentrated on the non-coated region A2 to extend it by adjusting the difference in level H to 150% of the thickness t1 or more. Further, wrinkling and cracking near the boundary X between the coated and non-coated regions A1 and A2 can be suppressed by adjusting the difference H to 600% of the thickness t1 or less. To improve the effect of preventing wrinkling and cracking, H should preferably be within the range of 200 to 400 (200≤H≤400).

The relief surface 44a is located opposite the edge portion Se of the electrode sheet S1. Specifically, the edge portion Se of the sheet S1 is located outside a start end portion P1 of the relief surface 44a with respect to the axial direction (Y-axis direction).

As shown in FIG. 4, moreover, a jamb angle θ at which the electrode sheet S1 is wound around the guide roller 36 should preferably be 60° or more.

Further, the guide roller 36 comprises a heater 36a for use as a heating device. Stretching deformation is facilitated by performing heat treatment by means of the heater in a bend-straightening process.

If the electrode sheet S1 wound around the guide roller 36 constructed in this manner is taken up by the take-up unit 33, its non-coated region A2 in contact with the contact surface is pulled and stretched in the longitudinal direction (feed direction) by tension. Accordingly, a bend of the electrode sheet S1 caused by a difference in elongation during press operation is corrected.

In a press method according to the present embodiment, the press apparatus 13 shown in FIG. 1 is used to wind out the rolled electrode sheet S1 to be subjected to a pressing process and stretching process. The electrode sheet S1 is obtained by previously applying an electrode material to the upper and lower surfaces of the base S0 and curing it by drying. Each electrode layer D is continuously formed in the longitudinal direction of the base S0. The electrode sheet S1 is formed with the coated region (first region) A1 in which the electrode layers D are formed and the non-coated region (second region) A2 in which the base S0 is exposed by virtue of not being coated with the electrode layers D.

The base (band-like electrical power collector) S0 is a metal foil of, for example, aluminum, aluminum alloy, or copper. The base S0 is, for example, 50 μm or less in thickness (in the Z-axis direction), hundreds of mm in width (in the Y-axis direction), and thousands of mm in length.

The electrode material (active material slurry) is prepared by, for example, adding an electrically conductive agent and binding agent to an active material as required and kneading these materials in the presence of a solvent. The active material used may be either a positive or negative one.

The positive active material is not limited to a specific one and may be any of various materials including, lithium-containing cobalt oxide (e.g., $LiCoO_2$), manganese dioxide, lithium manganese composite oxide (e.g., $LiMn_2O_4$ or $LiMnO_2$), lithium-containing nickel oxide (e.g., $LiNiO_2$), lithium-containing nickel-cobalt oxide (e.g., $LiNiO_{0.8}O_{0.2}O_2$), lithium-containing iron oxide, lithium-containing vanadium oxide, or chalcogenide, such as titanium disulfide or molybdenum disulfide.

The negative active material is not limited to a specific one and may be, for example, a graphitic or carbonaceous material (e.g., graphite, coke, carbon fiber, carbon spheres, pyrolytic gas-phase carbonaceous matter, or fired resin), chalcogenide (e.g., titanium disulfide, molybdenum disulfide, or niobium selenide), light metal (e.g., aluminum, aluminum alloy, magnesium alloy, lithium, or lithium alloy), or lithium titanium oxide (e.g., spinel lithium titanate).

The electrically conductive agent is not limited to a specific one and may be, for example, graphite, carbonaceous matter, acetylene black, or carbon black. The binding agent is not limited to a specific one, either, and may be, for example, polytetrafluoroethylene (PTFE), polyvinylidene fluoride (PVDF), or fluorocarbon rubber.

In the pressing process, the rolled electrode sheet S1 is wound out as it is inserted between the press rollers 31a and 31b to be compression-molded. The direction of insertion of the electrode sheet S1 is parallel to its longitudinal direction. Compression is applied mainly to the electrode layers D in the coated region A1, whereby the electrode layers D are compressed and densified. When this is done, the non-coated region A2 is hardly subjected to compression, so that the electrode sheet S1 extends less in the non-coated region A2 than in the coated region A1. Consequently, the electrode sheet S1 is distorted or warped.

The electrode sheet S1 passed between the press rollers 31a and 31b is transported downstream to the take-up unit 33 via the guide rollers 34 to 38. At the guide roller 36 that doubles as a bend-straightening device, as this is done, the coated and non-coated regions A1 and A2 are located opposite the small- and large-diameter portions 41 and 42, respectively, as shown in FIGS. 2 to 4. Thus, the non-coated region A2 of the electrode sheet S1 contacts the projecting surface 42a or the outer peripheral surface of the large-diameter portion 92, while the gap 40a is defined between the coated region A1 of the sheet S1 and the retracted surface 41a or the outer peripheral surface of the small-diameter portion 41.

In the stretching process, in this state, the electrode sheet S1 is taken up by the take-up unit 33. Preferably, in the stretching process, tensile stress F ($N/mm^2$) on a profile parallel to the short-side direction (transverse direction) of the electrode sheet S1 should be set within the range of 20 to 100 (20≤F≤100). If the tensile stress F is adjusted to 20 ($N/mm^2$) or more, an exposed portion of the electrical power collector can be fully extended without failing to maintain necessary stress to accurately take up the electrode. If the tensile stress F is adjusted to 100 ($N/mm^2$) or less, the exposed portion of the electrical power collector can be fully extended without causing fracture of the electrode or failing to accurately take up the electrode. To improve the effect of preventing fracture of the electrode and reduction in take-up accuracy, the tensile stress F should more preferably be set within the range of 20 to 40 (20≤F≤40), though depending on the difference in level and the shape of a corner portion.

In the stretching process, bend-straightening should preferably be performed while heat treatment is being performed at a temperature of, for example, 60 to 150° C. by the heater 36a. If the heat treatment temperature T is adjusted to 60° C. or more, the effect of reducing necessary stress for plastic deformation can be improved. If the stress applied to the electrode sheet S1 is constant, moreover, the effect of correcting distortion or warp of the electrode by heating can be improved. The higher the heat treatment temperature T, the more easily these effects can be achieved. To avoid degeneration of the electrode layers D by heating, however, the heat treatment temperature T should preferably be adjusted to 60 to 150° C.

Since the coated region A1 of the compression-molded electrode sheet S1 extends and slackens, the take-up tension (stress) at the guide roller 36 hardly acts on the sheet S1 and is concentrated on the non-coated region A2 that is not extended after compression. As this is done, the strain amount of the electrode can be reduced by about 10% relative to that after the compression when the electrode is transferred to the take-up unit 33 with the same tension as the take-up tension during the compression.

After passing through the guide roller 36, the electrode sheet S1 is taken up by the take-up unit 33 via the guide rollers 37 and 38. Further, an electrode body can be obtained by cutting the hooped electrode sheet S1 into a desired size as required. The electrode sheet S1 may also be used directly as an electrode body.

In a manufacturing process for a secondary battery, the battery is completed by successively performing various steps of processing, such as disposing the electrode body prepared in this manner in a battery container, injecting an electrolyte into the battery container, sealing the battery container, etc.

According to the embodiment described above, the compression-molded electrode sheet S1 is subjected to longitudinal tension such that the coated and non-coated regions A1 and A2 are located opposite the small-diameter portion (retracted portion) 41 and large-diameter portion (projecting portion) 42, respectively. Therefore, the tension can be concentrated on the non-coated region A2, so that the non-coated region can be plastically deformed and fully extended. Thus, distortion or warp of the electrode sheet S1 caused by the compression molding can be corrected, and fracture of electrodes being manufactured can be prevented. Consequently, high-quality electrodes can be manufactured with high production efficiency.

According to the present embodiment, moreover, concentration of stress on the edge portion Se of the non-coated region A2 can be mitigated by locating the edge portion Se opposite the relief surface. If fine cracks or the like are formed in the end surface of the edge portion Se of the base S0, therefore, cracking and fracture can be prevented by reducing stress. Thus, if flaws or cracks in the end face, for example, are subjected to stress concentration, they easily cause cracking or fracture. In the present embodiment, however, stress concentration can be avoided by such a simple configuration that the diameter of that part of the guide roller 36 which faces the edge portion is gradually decreased to form the relief surface 44a that is retracted from the conveying plane 40 toward the axis (or downward in FIG. 3).

The present invention is not limited to the embodiment described above, and can be suitably modified. For example, the press rollers 31a and 31b are used for the press unit 31 in the above-described embodiment. However, the press rollers can be replaced with some other structure that can densify the electrode layers D. For example, a flat press can be used in place of the press rollers. In the pressing process, moreover, the compression may be varied in a multi-stage manner.

In the embodiment described above, the single guide roller 36, out of the plurality of guide rollers, is used as the bend-straightening device. However, the number of guide rollers is not limited to five, and the number and position(s) of guide roller(s) used as the bend-straightening device is not limited to the above-described embodiment.

The outer peripheral surface of the large-diameter portion 42 is formed as the projecting surface that projects from the periphery of one end portion of the guide roller 36 in the direction of its rotational axis. However, this outer peripheral surface may be any surface that can provide the effect of extending the non-coated region A2. For example, the positions and numbers of the step portion and large- and small-diameter portions can be changed as required.

Although the electrode layers D are disposed on the opposite surfaces of the base S0, individually, only a single electrode layer D may be disposed on one surface of the base S0.

Figure 5:
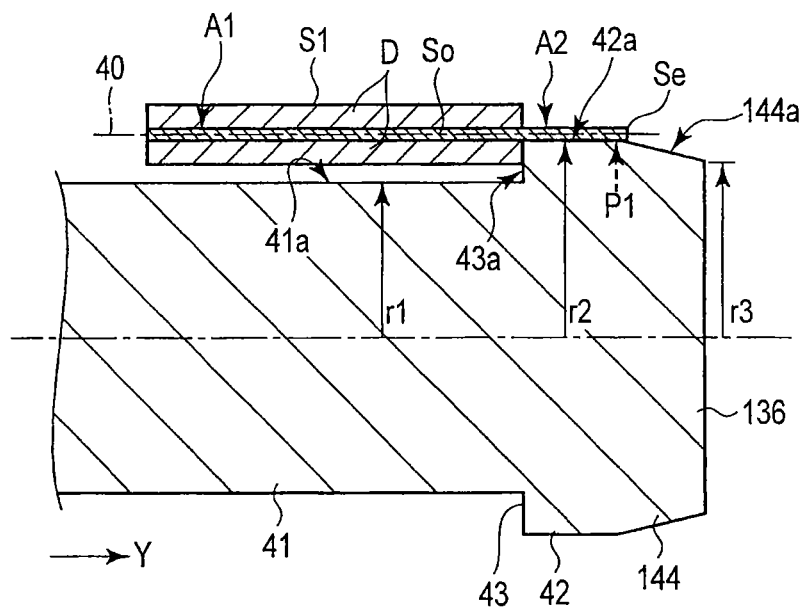
FIG. 5 is a sectional view showing a configuration of a guide roller according to another embodiment.

Although the relief portion 44 of the guide roller 36 according to the above-described embodiment is formed continuous with the large-diameter portion 42 and rounded so that its diameter gradually decreases and its profile is curved, the shape of the relief portion 44 is not limited to this. For example, a guide roller 136 shown in FIG. 5 comprises a tapered relief portion 144 at an axial distance from a step portion 43 such that its diameter decreases and its profile is inclined. The outer surface of the relief portion 144 forms a relief surface 144a. Also in the case where the diameter is changed so that the shape of the profile is straight, stress concentration on an edge portion Se can be mitigated, so that the same effects as those of the first embodiment can be obtained.

Figure 6:
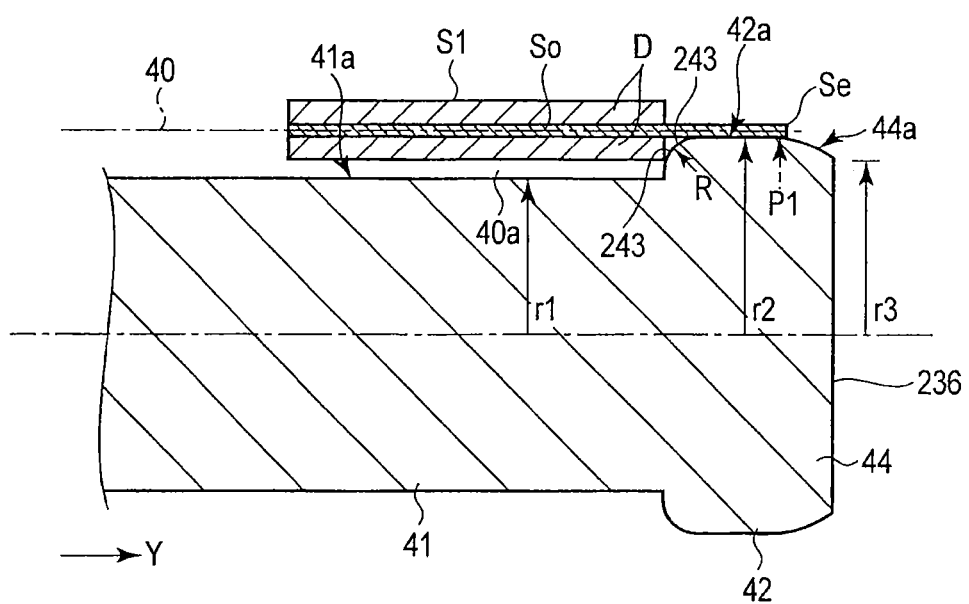
FIG. 6 is a sectional view showing a configuration of a guide roller according to still another embodiment.

Further, the step portion 43 of the guide roller 36 is right-angled or substantially right-angled in the example shown in FIG. 2. Alternatively, however, the step portion 43 may be tapered. In a guide roller 236 shown in FIG. 6, for example, a corner portion of a step portion 243 has a curved surface with radius of curvature R. The smaller the radius of curvature R of the corner portion, the greater the effect of extending an exposed portion of an electrical power collector is. If the electrode meanders, however, the smaller radius causes electrode fracture more easily. Preferably, therefore, the radius of curvature R (mm) should be set within the range of 0.5 to 7 mm ($0.5\ mm \leq R \leq 7\ mm$).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A press apparatus for an electrode, comprising:
a press unit configured to compress an electrode sheet comprising a first region formed with an electrode layer on a surface thereof and a second region on which the electrode layer is not formed; and
a stretching unit comprising a stretching member, which comprises a projecting surface located opposite the electrode sheet and projecting toward the electrode sheet, in a position corresponding to the second region, a retracted surface retracted from the electrode sheet relative to the projecting surface, in a position corresponding to the first region, and a relief surface retracted away from the electrode sheet, in a position corresponding to an edge portion of the electrode sheet, and configured to apply tension to the second region,
wherein the stretching member is a roller comprising a small-diameter portion, a large-diameter portion having a diameter larger than that of the small-diameter portion, and a relief portion having a diameter gradually reduced at a part distant from a boundary between the small-diameter and large-diameter portions on the side of the large-diameter portion, outer peripheral surfaces of the small-diameter portion, the large-diameter portion, and the relief portion constitute the retracted surface, the projecting surface, and the relief surface, respectively, the first region of the electrode sheet is located opposite the small-diameter portion, the second region of the electrode sheet is located opposite the large-diameter portion, a boundary between the first region and the second region of the electrode sheet is located nearer to the small-diameter portion than a step between the large-diameter portion and the small-diameter portion, an outer peripheral surface of the small-diameter portion is out of contact with the first region, and an outer peripheral surface of the large-diameter portion is in contact with the second region from the boundary between the small-diameter and large-diameter portions to the relief surface.

2. The press apparatus for an electrode of claim 1, wherein the relief portion is formed in a round shape with a curved cross-sectional profile.

3. A manufacturing apparatus for an electrode, comprising:
a press apparatus for an electrode comprising:
  a press unit configured to compress an electrode sheet comprising a first region formed with an electrode layer on a surface thereof and a second region on which the electrode layer is not formed; and
  a stretching unit comprising a stretching member, which comprises a projecting surface located opposite the electrode sheet and projecting toward the electrode sheet, in a position corresponding to the second region, a retracted surface retracted from the electrode sheet relative to the projecting surface, in a position corresponding to the first region, and a relief surface retracted away from the electrode sheet, in a position corresponding to an edge portion of the electrode sheet, and configured to apply tension to the second region, wherein the stretching member is a roller comprising a small-diameter portion, a large-diameter portion having a diameter larger than that of the small-diameter portion, and a relief portion having a diameter gradually reduced at a part distant from a boundary between the small-diameter and large-diameter portions on the side of the large-diameter portion, outer peripheral surfaces of the small-diameter portion, the large-diameter portion, and the relief portion constitute the retracted surface, the projecting surface, and the relief surface, respectively, the first region of the electrode sheet is located opposite the small-diameter portion, the second region of the electrode sheet is located opposite the large-diameter portion, a boundary between the first region and the second region of the electrode sheet is located nearer to the small-diameter portion than a step between the large-diameter portion and the small-diameter portion, an outer peripheral surface of the small-diameter portion is out of contact with the first region, and an outer peripheral surface of the large-diameter portion is in contact with the second region from the boundary between the small-diameter and large-diameter portions to the relief surface.

\* \* \* \* \*